United States Patent [19]

Hindman et al.

[11] Patent Number: 4,549,893
[45] Date of Patent: Oct. 29, 1985

[54] HOT CULLET HANDLING APPARATUS

[75] Inventors: David B. Hindman, Rochester; Lawrence L. Gerlach, Spencerport; Bruce A. Wallace, Rochester, all of N.Y.

[73] Assignee: French Systems, Inc., Rochester, N.Y.

[21] Appl. No.: 552,617

[22] Filed: Nov. 17, 1983

[51] Int. Cl.[4] .............................................. C03B 7/00
[52] U.S. Cl. ......................................... 65/28; 65/165
[58] Field of Search ................... 65/28, 127, 165, 17, 65/19; 241/99; 193/11

[56] References Cited

U.S. PATENT DOCUMENTS 3,833,354  9/1974  Thummler et al. ................. 65/19
4,046,541  9/1977  Anderson ............................. 65/19

FOREIGN PATENT DOCUMENTS 39445  10/1978  Japan ................................. 65/19
40197  10/1978  Japan ................................. 65/19
2295   1/1979   Japan ................................. 65/19

OTHER PUBLICATIONS

"Custom Systems for Machine Chip Collection and Cooling", sales brochure by M. J. French Company, Inc., 12/3/76, pp. 1-3.

Primary Examiner—Kenneth M. Schor
Assistant Examiner—Michael K. Boyer
Attorney, Agent, or Firm—Shlesinger, Fitzsimmons & Shlesinger

[57] ABSTRACT

A plurality of open trenches or sluices is suspended from the underside of the forming floor of a glass factory to register with the lower, discharge ends of hot gob reject or cullet chutes. Each sluice is suspended with one end higher than the other, and with their lower, discharge ends communicating with one end of a large quenching tank, which is mounted on the floor beneath the forming floor. The tank contains a supply of cooling water, which is continuously pumped to the upper ends of the sluices, so that as hot gobs drop from the chutes into the sluices they are immersed in the cooling water and travel by gravity with the cooling water downwardly in the sluices to the quenching tank. A conveyor in the tank transports the cullet through the cooling water to a discharge point adjacent the opposite end of the tank. The bottom of each sluice is generally V-shaped in configuration so that frictional engagement of the hot cullet with opposite sides of a sluice is minimized.

4 Claims, 3 Drawing Figures

HOT CULLET HANDLING APPARATUS

BACKGROUND OF THE INVENTION

This invention relates to glass manufacturing, and more particularly to improved apparatus for handling or disposing of pieces of hot glass or cullet, which are rejected during the manufacture of glass articles, for example during the manufacture of glass bottles.

By its very nature a glass furnace is designed for continuous operation. During the production of glass bottles, for example, a supply of molten glass is fed from a melting chamber in a furnace to a refiner/riser section, and then to forehearths from where it is dispensed to various stations of an adjacent bottle forming machine. During this dispensing operation molten glass flows in the form of a gob from the orifice of each of several adjacent forehearths, each gob being severed by a pair of adjacent shears and conveyed by an indexing arm to a given station on the bottle forming machine. However, if for some reason the machine is not in a position at that moment to accept the gob, the indexing arm does not pass beneath the orifice, so that the severed gob is allowed instead to drop directly into the upper end of a gob drop chute, the lower end of which extends beneath the floor to overlie some form of cullet handling or disposal apparatus.

In the case of one such conventional apparatus the rejected gobs drop out of the lower ends of the chutes in a semi-molten state into one or more so-called Roura Hoppers, where they tend to congeal or mold together to form a single, large gob. Periodically each Hopper is conveyed out of the factory by a fork truck, or the like, and dumped into a cullet yard, where the cullet are left to cool.

Instead of simply allowing the gobs to drop into a Roura Hopper, it has also been customary to employ a more automated system in the form of a vibratory trough, which is positioned generally horizontally beneath the discharge ends of the gob drop chutes. The trough, which contains water for cooling the gobs as they drop into the conveyor, is subjected to intense vibrations which tend to cause the gobs therein to bounce or shift longitudinally down the length of the trough and off one end thereof onto the moving surface of a conveyor.

One disadvantage of this vibratory-type trough is that its framework must be supported directly on the floor beneath the discharge ends of the gob drop chutes so that the trough itself can be subjected to the intense vibrations necessary to impart motion to the cullet or gobs. Moreover, while it is usually designed to cool the individual gobs sufficiently to prevent any undesirable molding thereof one to another, it nevertheless is not possible to produce a predetermined quench time for all of the gobs which are fed to the trough, because the gobs last to fall into the trough are those which are discharged from the drop chutes closest to the discharge end of the trough. As a consequence, at the moment they are discharged from the trough onto the conveyor, they will be substantially hotter than those gobs which enter the trough at or adjacent the end thereof remote from its discharge end. Furthermore, this type of installation is an extremely noisy and expensive installation, and makes extremely inefficient use of the cooling water, which upon overflow is allowed simply to drain away as waste water.

It is an object of this invention, therefore, to provide improved apparatus for handling the waste glass or hot cullet produced by glass fabricating machines of the type described. More particularly, it is an object to provide apparatus of the type described which is easy to install, and which permits uniform quenching time of hot cullet.

Another object of this invention is to provide an improved cullet disposal method and associated apparatus therefor which is substantially more versatile and efficient than conventional systems of the type employing vibratory troughs.

Still other objects of the invention will be apparent hereinafter from the specification and from the recital of the appended claims, particularly when read in conjunction with the accompanying drawings.

SUMMARY OF THE INVENTION

A plurality of sluices or open troughs are suspended from the underside of the forming floor of a glass factory, or the like, so as to register with the lower, discharge ends of a series of hot gob drop chutes, or cullet chutes which are secured intermediate their ends in the forming floor. The sluices, which are inclined slightly to the vertical, have cooling water supplied to their upper ends, and have their lower ends overlying a special quench tank that is mounted on a factory floor beneath the forming floor. The bottom of each sluice is generally V-shaped in cross sectional configuration so that gobs dropping into a sluice roll in the presence of cooling water downwardly out of the lower end of the sluice into the quenching tank.

The quenching tank is filled with cooling water which is filtered, if desired, and then pumped into the upper ends of the sluices and allowed to flow by gravity downwardly through the sluices and back into the quenching tank, thus providing continuous recirculation of the cooling water in the system. Mounted in the bottom of the tank, is an endless conveyor or cullet dispenser, which conveys cullet off of one end of the quenching tank onto an open conveyor or collection belt, which conveys the quenched cullet toward a cullet yard at the exterior of the factory.

THE DRAWINGS

FIG. 1 is a fragmentary sectional view taken on a vertical plane extending through the first and basement floors of a factory or building containing one or more glass furnaces, and illustrating for one such furnace improved hot gob handling apparatus made according to one embodiment of this invention, portions of the apparatus being broken away and shown in section, and the cooling water system for this apparatus being shown schematically;

FIG. 2 is a fragmentary sectional view taken generally along the line 2—2 in FIG. 1 looking in the direction of the arrows; and FIG. 3 is an enlarged sectional view taken generally along the line 3—3 in FIG. 2 looking in the direction of the arrows.

DETAILED DESCRIPTION OF THE PREFERRED EMBODIMENTS

Figure 1:
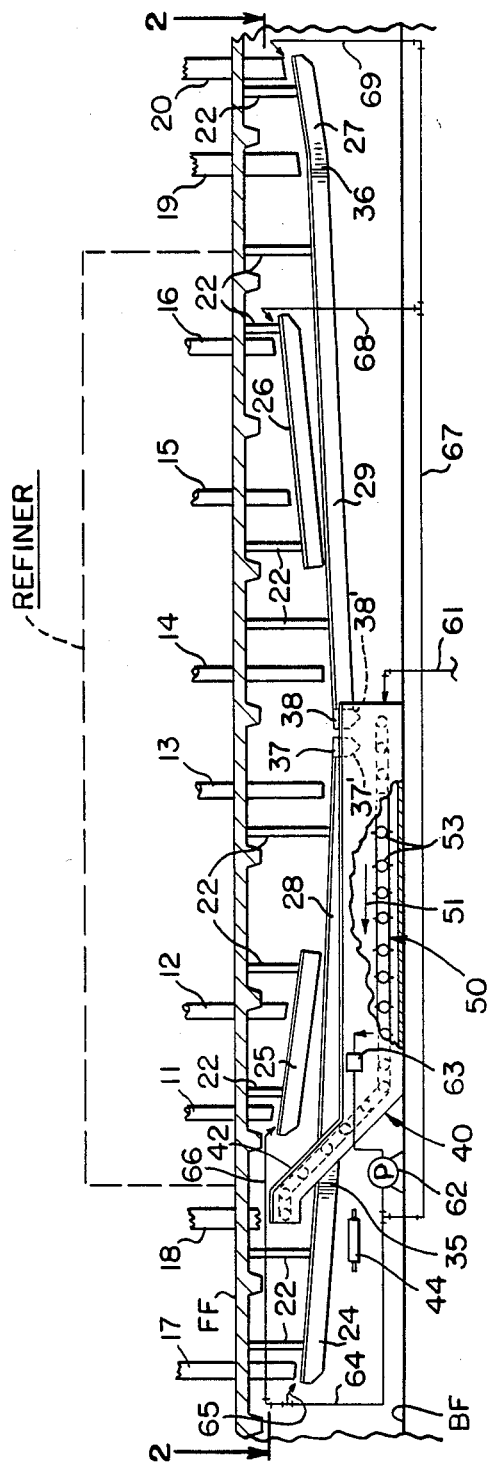

Referring now to the drawings by numerals of reference, the refiner (broken lines in FIGS. 1 and 2) of a conventional glass furnace is located, in the embodiment illustrated, on the forming floor or first floor FF of a glass factory to be spaced above its basement floor BF. Secured intermediate their ends in the usual manner in the forming floor FF around the operating ends of the forehearths is a plurality (six in the embodiment illustrated) of hot gob drop chutes 11, 12, 13, 14, 15 and 16. As shown more clearly in FIG. 2, these chutes are arrayed in a curved path around the operating end of the refiner. Also secured intermediate their ends in the forming floor FF adjacent opposite ends, respectively, of the curved path defined by the hot gob chutes 11-16 are two spaced pairs of hot bottle drop chutes 17, 18, and 19, 20, respectively.

Merely for purposes of illustration the hot gob chutes 11-16 have been shown to be circular in cross section (FIG. 2) while chutes 17-20 have been shown to be generally rectangular in cross section. Although not illustrated in the drawings, it is to be understood that the upper ends of chutes 11-16 register each with a different orifice in the forehearth so as to receive the hot gobs of glass rejected by the associated article forming machine (not illustrated), such for example a bottle forming machine. Hot glass gobs entering the upper ends of chutes 11-16 are then conveyed downwardly by the chutes to the handling system described in greater detail hereinafter.

Unlike the chutes 11-16, the upper ends of the chutes 17 to 20 do not register with any of the orifices in the forehearths, but instead are adapted to receive hot bottles which, because of defects, are rejected after being formed on the bottle forming machine. These hot bottles are then conveyed downwardly by the respective chutes 17-20 toward the hereinafter described handling apparatus.

Figure 3:
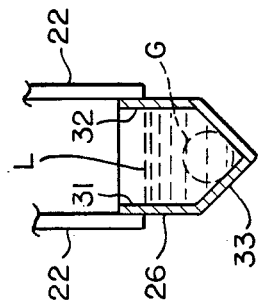

Suspended from the underside of the forming floor FF by a plurality of hangers or straps 22 is a series of inclined sluices or open trough, which are denoted by the numerals 24, 25, 26, 27, 28 and 29, respectively. Each of these sluices is similar in cross sectional configuration, and as shown in FIG. 3, comprises a pair of spaced, parallel sidewalls 31 and 32 the lower edges of which are interconnected by an integral, generally V-shaped bottom wall 33.

Figure 2:
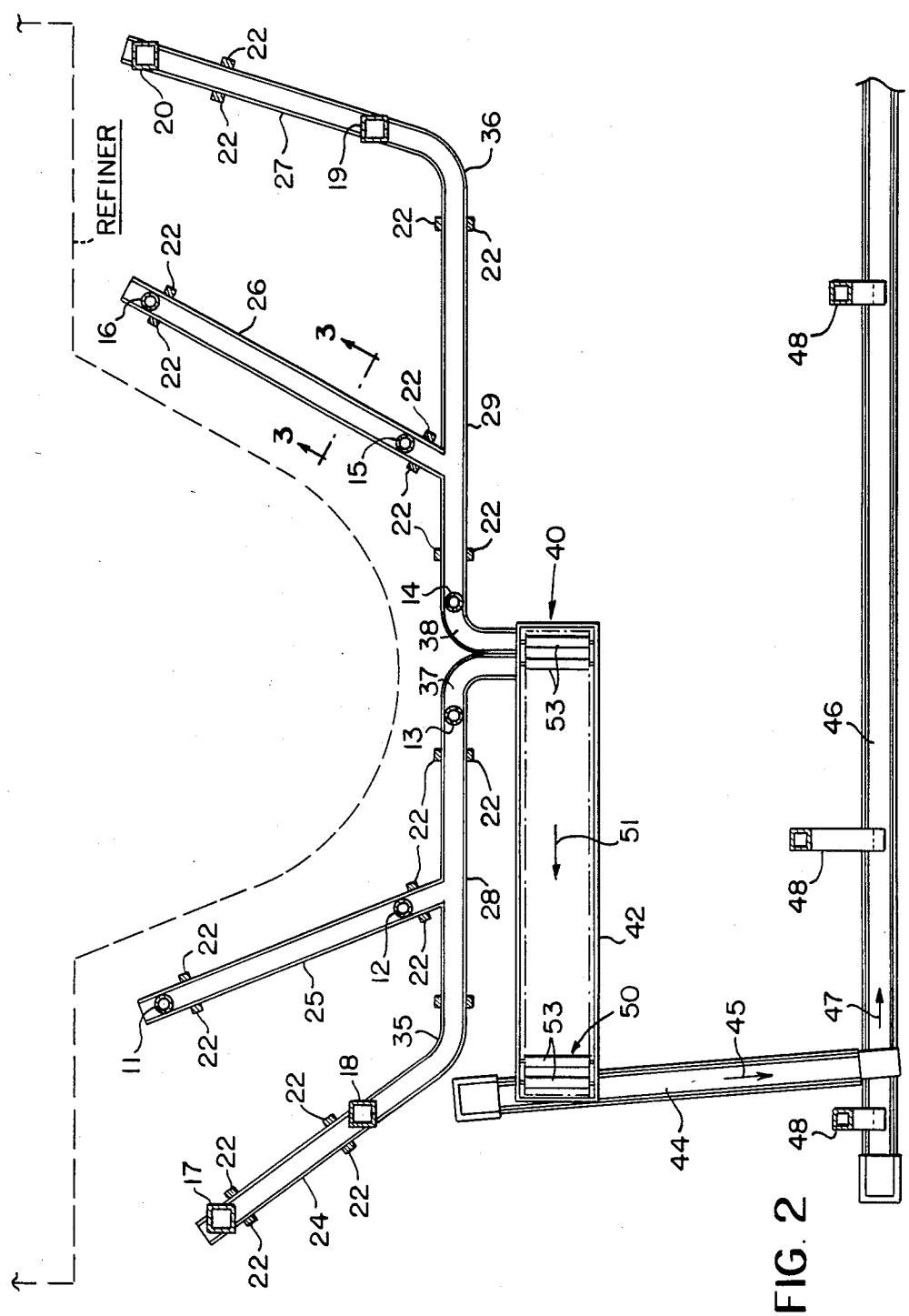

As shown more clearly in FIG. 2, the sluice 24 registers with the lower ends of the hot bottle chutes 17 and 18, and has its upper end (the end beneath the chute 17) elevated slightly relative to its lower end, which merges as at 35 with one end of sluice 28. In a somewhat similar manner, sluice 27 registers with the lower ends of the hot bottle chutes 19 and 20, and also has its upper end elevated slightly above its lower end, which merges as at 36 with one end of the sluice 29. Also as seen more clearly in FIG. 2, the sections 35 and 36, which interconnect the sluices 24, 28 and 27, 29, respectively, are curved so as not to impede the flow of water and cullet through these sluices, as noted in greater detail hereinafter.

The sluices 25 and 26 are mounted beneath the lower ends of the two sets of hot gob chutes 11, 12, and 15, 16, respectively; and as in the case of the sluices 24 and 27, their upper ends are suspended somewhat above or higher than their lower ends. Moreover, as shown by FIGS. 1 and 2, the lower, discharge ends of the sluices 25 and 26 overlie the open troughs or sluices 28 and 29 intermediate the ends of the latter, so that any water and/or cullet discharged from sluices 25 and 26 will drop directly into the respective sluices 28 and 29.

Remote from their curved connecting sections 35 and 36 the sluices 28 and 29 pass beneath the discharge ends of the hot gob chutes 13 and 14, respectively, and then curve laterally as at 37 and 38, respectively, into near tangential, side-by-side relation, so that their discharge ends open as at 37' and 38' (FIG. 1) on one end of a large quenching tank 40, which is mounted on the basement floor BF adjacent one side of the sluice 28. Adjacent its opposite, or discharge end, tank 40 is inclined upperwardly as at 42 to overlie a belt conveyor 44, which is mounted in a conventional manner on the basement floor BF so as to have its upper run travel in the direction indicated by the arrow 45 in FIG. 2. The discharge end of the conveyor 44 overlies one end of another belt conveyor 46 (FIG. 2), which is mounted on the floor BF to have its upper run driven in the direction indicated by the arrow 47 (FIG. 2).

Mounted in conventional manner in the quench tank 40 is an elongate, endless conveyor belt 50, the upper run of which is adapted to be driven by a conventional drive mechanism (not illustrated) in the direction indicated by the arrow 51. The belt 50, which is shown partially in phantom by broken lines in FIG. 2, is mounted just above the bottom of tank 40 to extend continuously from a point immediately adjacent the cullet inlet end of the tank (the right hand end thereof as shown in FIGS. 1 and 2) to a point immediately adjacent its discharge end. Conveyor 50 may include a plurality of spaced, parallel, transversely extending rib members 53, which project from the surface of the belt for the purpose of engaging and transporting cullet and hot bottle rejects longitudinally through the tank from its inlet, and upwardly of its inclined section to its discharge end. The cullet and bottles which are delivered by the conveyor 50 to the discharge end of tank 40, drop downwardly onto the belt conveyor 45, which then conveys this material onto the other conveyor 46. Conveyor 46 may be designed to transport the glass rejects toward the factory cullet yard (not illustrated). Also, as shown in FIG. 2, a plurality of cold bottle chutes 48 may be mounted intermediate their ends in the forming floor FF to open at their lower ends on the conveyor belt 46 for the purpose of permitting cold bottle rejects (i.e., bottles rejected after inspection) to be dropped from the forming floor FF downwardly and directly onto the cullet yard conveyor belt 46.

In use, cooling water is supplied to the quench tank 40 by a water supply pipe 61 (shown schematically in FIG. 1), and is maintained at a predetermined level by conventional control means (not illustrated). In order to commence the cooling of the cullet and bottle rejects the minute that they enter the sluices 24-29, the water in tank 40 is constantly circulated through the sluices and then back into the tank 40 by a conventional pump 62. Pump 62 has its inlet side connected through a filter 63 (FIG. 1) to the water in the tank 40, so that when the pump is operating water from the tank is drawn first through filter 63, and then through pump 62 to its discharge side, from where it is pumped through pipes 64, 65, and 66 into the upper ends of sluices 24 and 25, and by pipes 67, 68 and 69 into the upper ends of the sluices 26 and 27. Since the lower ends of sluices 24, 25, and 26, 27 are operatively connected to, or overlie the sluices 28 and 29, the water from sluices 24-27 is eventually conveyed by sluices 28 and 29 back into the tank 40 to be filtered by filter 63 and recirculated by pump 62. In this manner it is possible to minimize the use of cooling water.

In practice it is desirable, although not absolutely necessary, to pump enough water into the upper ends of the sluices 24-27 to assure that the cullets or hot bottles that drop into the sluices will be submerged in the cooling water, as shown for example in FIG. 3 where the level of the cooling water is denoted at L, and a hot gob of glass is denoted in broken lines at G. The V-shaped bottom of each sluice has been found to be very effective in causing the gob quickly to be centered in the liquid cooling water that is flowing through the sluice. As soon as a hot gob contacts the cooling water in a sluice its outside surface tends immediately (within a couple of seconds) to cool and form around the outside of the gob a thin shell (perhaps 1/16" thick), which prevents the gob from adhering to the sides of the sluices, and which also causes the gob to retain its shape during its travel downwardly in a respective sluice toward the quenching tank. A predetermined period of quenching time is required before the hot gobs can be transferred to a conventional, open belt conveyor. This interval, which can be as much as five or six minutes, may be controlled simply by adjusting the rate at which hot gobs are moved by the conveyor 50 from the quenching tank 40 to the conveyor 44. It has been found also that the rate of cooling for the first five or six minutes of quenching is rather rapid, but the cooling slows considerably from that point on.

The rates at which the hot gobs travel in the sluices will be affected by the rate at which the cooling water is supplied to the sluices, and by the pitch of the sluices. Tests have indicated that rates ranging from four to ten feet per second can be satisfactorily achieved. Tests have also indicated that gobs of hot glass ranging from eight to fifty ounces can be satisfactorily conveyed in sluices in which the flow rate of the cooling water ranges from 200 to 500 g.p.m. for a sluice pitch in the range of from ¼ to ⅜ inches per foot. Although it is not absolutely necessary that the gobs be completely immersed in the cooling water in the sluices, best results are achieved when the gobs are completely immersed, at which times they appear to float in envelopes of steam which are generated around the outsides of the gobs. Obviously the cooling water flow rates and sluice pitches will vary depending upon the sizes of the gobs and/or hot bottles to be handled by the sluices.

One of the principal advantages of this invention is that the various sluices can be provided with curves or bends, which enable them to be designed to pass around fixtures or columns which may already be present in a factory. This makes the system very versatile, since it can be installed without requiring removal or repositioning of structural portions of a factory. This contrasts with the vibratory type troughs heretofore employed in such factories, and which could not be designed readily to curve around obstructions. Moreover, since the sluices employed in this invention are suspended from the ceiling of the floor beneath the forming floor of a factory, they make more efficient use of the space available. The only major stationary structure which has to be mounted on the floor beneath the sluices is the quenching tank 40.

Although in the preferred embodiment the conveyor 50 in the quenching tank is designed to discharge onto an open, conventional conveyor belt, it will be readily apparent to one skilled in the art that such belt could be replaced a simple hopper or collection device, which could then be periodically emptied by any conventional means into the cullet yard of the factory, rather than having the cullet conveyed into the yard by the belt conveyors 44 and 46. Furthermore, while this invention has been illustrated and described in detail in connection with glass fabricating mechanisms, it will be apparent it likewise could be employed for handling or disposing of hot products other than glass. Moreover, although the sluices 25 and 26 have been shown to have their discharge ends positioned above, and in intersecting relation with the sluices 28 and 29, it will be readily apparent that they could merge into the sides of the sluices 28 and 29, provided they do so above the path of travel of the cooling water and cullet in the sluice 28 and 29 proper. With such a construction the cullet discharged from the sluices 25 and 26 will drop down into the sluices 28 and 29, thus preventing any undesirable jamming at the intersections of the sluices.

While this invention has been illustrated and described in connection with only certain embodiments thereof, it will be apparent that it is capable of still further modification, and that this application is intended to cover any such modifications as may fall within the scope of one skilled in the art, or the appended claims.

What is claimed is:

1. A method of disposing of hot gobs of glass which are discharged downwardly in spaced reject chutes from the forming floor of a glass factory to another floor therebeneath, comprising positioning a quenching tank on said other floor in laterally offset relation to at least certain of the lower, discharge ends of said chutes, connecting the lower, discharge ends of said chutes to said quenching tank adjacent one end thereof by means of a series of open, generally trough-shaped sluices the open sides of which register with the lower ends of said chutes to receive hot gobs of glass from said chutes, opposite ends of said sluices being positioned one sightly above the other so that each sluice is inclined to the vertical, supplying cooling water to said tank to maintain the cooling water at a predetermined level in said tank, continuously recirculating cooling water from said tank to the upper ends of said sluices instantly to quench the hot gobs upon discharge thereof from said chutes to said sluices, and thereby to form around the outside of each gob a thin shelf, which causes each gob to retain its shape and enables the quenched gobs to be conveyed by gravity through the sluices to the tank, and conveying said gobs through said tank to a discharge point adjacent the opposite end thereof, and at a rate which is set to reduce the temperature of each gob below a predetermined value before discharge from the tank.

2. The method as defined in claim 1, including maintaining said hot gobs substantially fully immersed in said cooling water during passage thereof through said sluices to said tank.

3. The method as defined in claim 1, wherein said gobs are retained in said tank for at least approximately five minutes.

4. The method as defined in claim 1, wherein the rate of flow of the cooling water in said sluices is in the range of from approximately 200 to 500 g.p.m. for a sluice pitch in the range of from approximately ¼" to ⅜" per foot.

* * * * *